United States Patent [19]

Tannas, Jr.

[11] 4,017,848
[45] Apr. 12, 1977

[54] TRANSPARENT KEYBOARD SWITCH AND ARRAY

[75] Inventor: Lawrence E. Tannas, Jr., Orange, Calif.

[73] Assignee: Rockwell International Corporation, El Segundo, Calif.

[22] Filed: May 19, 1975

[21] Appl. No.: 579,114

[52] U.S. Cl. .................... 340/365 R; 340/324 M; 340/337

[51] Int. Cl.² ........................................ G08C 1/00

[58] Field of Search ....... 340/365 C, 365 A, 365 R, 340/337, 324 M

[56] References Cited

UNITED STATES PATENTS

| | | | |
|---|---|---|---|
| 3,207,905 | 9/1965 | Brag | 340/365 C |
| 3,495,232 | 2/1970 | Wagner | 340/365 A |
| 3,560,675 | 2/1971 | Krakinowski | 340/365 A |
| 3,757,322 | 9/1973 | Barkan | 340/337 |
| 3,772,685 | 11/1973 | Masa | 340/365 C |
| 3,956,745 | 5/1976 | Ellis | 340/337 |

Primary Examiner—Thomas B. Habecker
Attorney, Agent, or Firm—H. Fredrick Hamann; G. Donald Weber, Jr.; Robert Ochis

[57] ABSTRACT

A transparent keyboard switch which is suitable for use in switch arrays is disclosed. Switch nomenclature may be positioned behind the switch and viewed from in front of the switch. The transparent switch comprises a relatively rigid electrically insulating transparent substrate having a "lower" electrode disposed on the upper surface thereof and a relatively flexible transparent film having an "upper" electrode disposed on the underside thereof and a layer of electrically insulating fluid spacing the upper electrode from the lower electrode. The switch is rendered conductive by pressing on the flexible film to locally displace the electrically insulating fluid from between upper and lower switch electrodes and bring them into contact, thereby making the switch a closed circuit.

8 Claims, 10 Drawing Figures

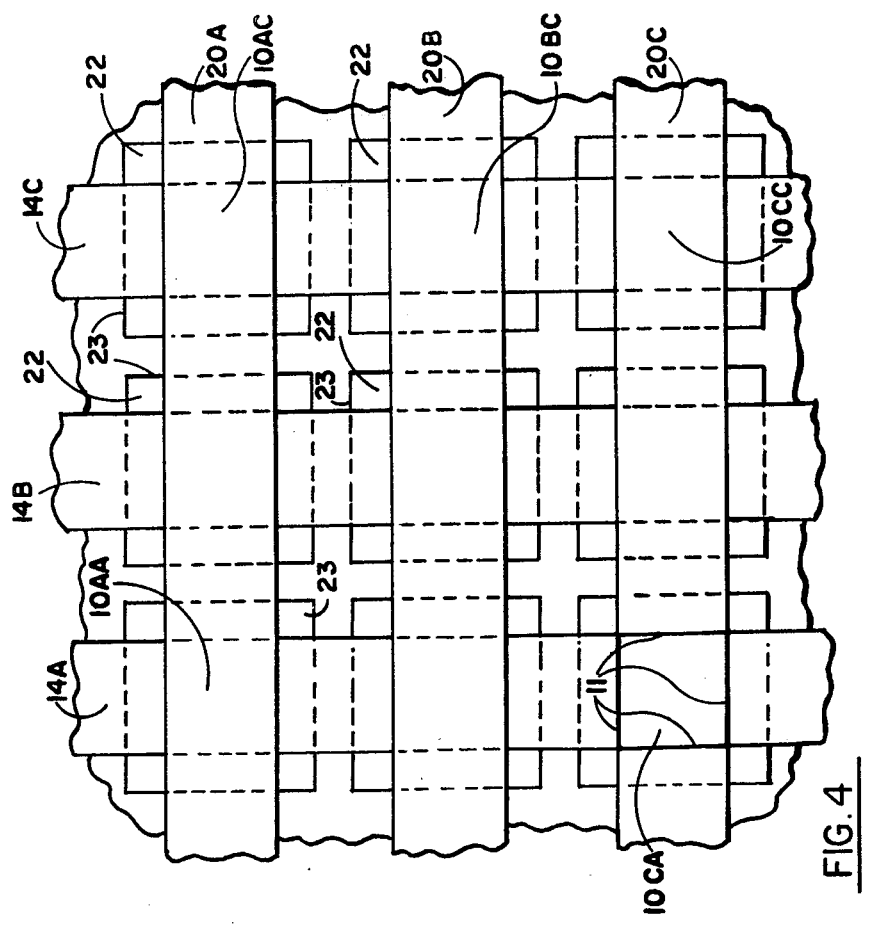
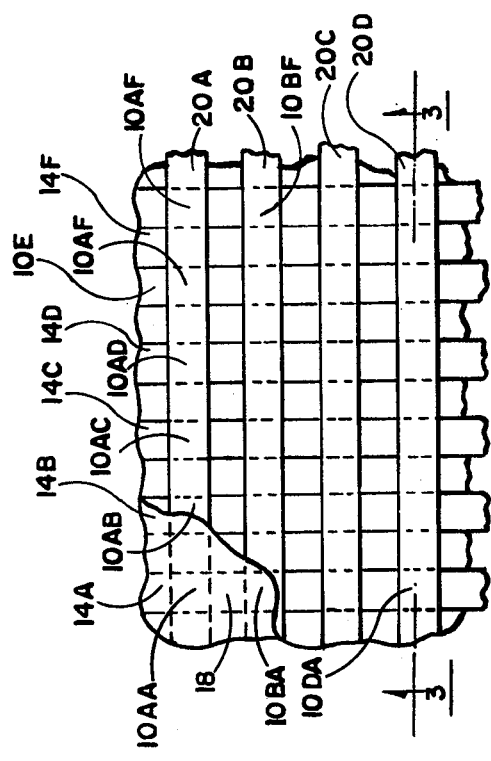
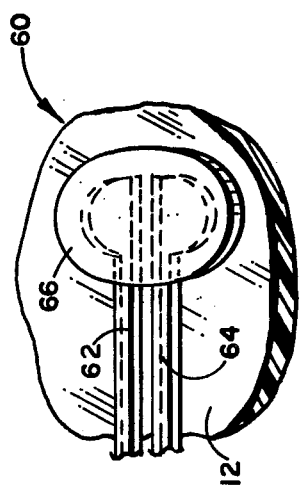
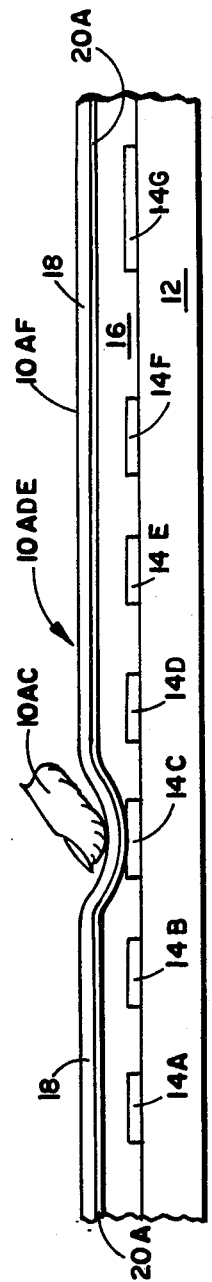
FIG. 2
FIG. 3
FIG. 4
FIG. 6

TRANSPARENT KEYBOARD SWITCH AND ARRAY

BACKGROUND OF THE INVENTION

1. Field of the Invention

The invention relates to the field of keyboard switches.

2. Prior Art

So-called transparent switches are known in the art. However, the prior art transparent switches contain embedded wires which are visible and also contain a significant manufacturing imperfections and/or internal structures which are readily apparent to the observer. Both of these features detract from the effect of the transparency of the switch and are esthetically displeasing. Consequently, a visually featureless transparent switch which is water clear is needed.

SUMMARY OF THE INVENTION

A transparent keyboard switch in accordance with the invention comprises a relatively rigid, transparent, electrically insulating substrate having a transparent "lower" switch electrode disposed thereon; a relatively flexible, transparent, electrically insulating top film having a transparent "upper" switch electrode on the lower surface and a layer of electrically insulating fluid between the film and substrate to separate the upper electrode from the lower electrode. The switch is closed by pressing on the flexible film at a point where the upper and lower electrodes overlap, thereby displacing the electrically insulating fluid from between the electrodes and bring the electrodes into electrically conducting contact.

BRIEF DESCRIPTION OF THE DRAWINGS

FIG. 2 is an illustration in plan view of a set of crossbar switches in accordance with the invention.

FIG. 3 is an illustration of a cross-section of the crossbar switch array of FIG. 2 taken along the line 3—3.

FIG. 4 is a plan view of the crossbar switch array of FIG. 2 on an enlarged scale.

FIG. 6 illustrates a possible electrode configuration for a single pole single throw switch.

DETAILED DESCRIPTION OF THE PREFERRED EMBODIMENT

Figure 1:
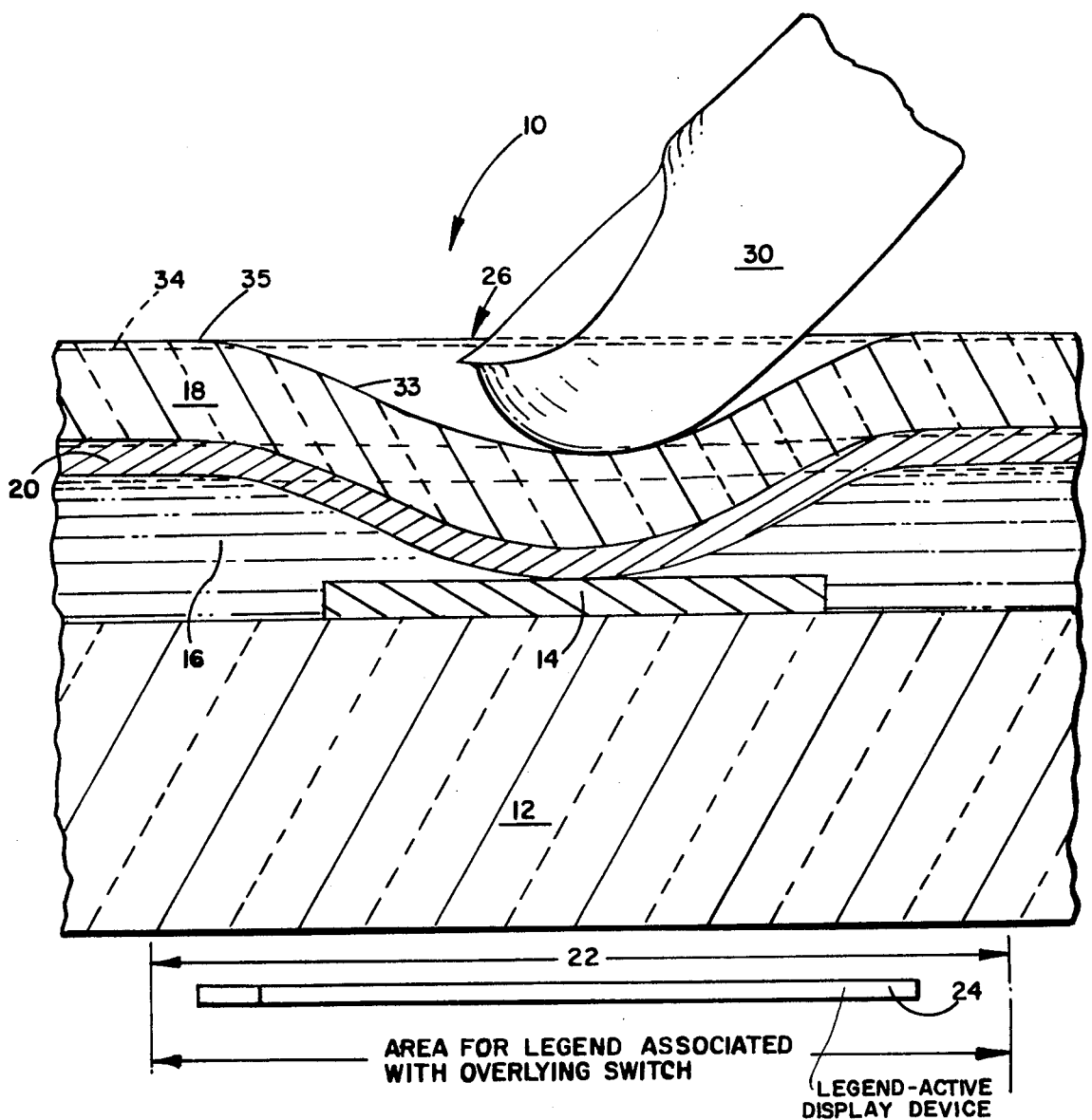
FIG. 1 is an illustration in cross-section of one switch area within the switch array of the present invention. The switch is shown in the closed state in solid lines and open state of the switch is illustrated in phantom lines.

A single switch in accordance with this invention may be constructed and utilized by itself. However, the switch is preferably utilized as one switch in an array of similar switches. FIG. 1 is an illustration in cross-section of a switch 10 in accordance with the invention. In FIG. 1, the closed or conducting state of switch 10 is illustrated in solid lines and in the open or non-conducting state of switch 10 is illustrated in dashed lines.

Switch 10 comprises a relatively rigid transparent substrate 12 upon which a lower transparent electrode 14 is disposed. Lower electrode 14 may also be referred to as a substrate electrode. When switch 10 is in its open or non-conducting state, an electrically insulating dielectric fluid 16 overlies both substrate 12 and lower electrode 14. A relatively flexible transparent film 18 overlies dielectric fluid 16. A transparent upper electrode 20 adheres to the underside of transparent film 18. Upper electrode 20 may also be referred to as a film electrode. When switch 10 is in its open state, upper electrode 20 is spaced from lower electrode 14 by the dielectric fluid 16. This condition of the switch is shown in dashed lines. Upper electrode 20 and lower electrode 14 are disposed in overlapping relation at least at the location 26 where it is desired to have switch action. Under the location where switch action is to occur, a legend region 22 is set aside for provision of a visible legend 24 to be associated with the switch. Legend 24 may be a passive display such as printing on a legend card or it may be an active display, such as an electronically or mechanically controlled display or any other compatible controllable display.

In order to close switch 10 and render it closed or conducting, pressure is applied to the switch action area 26 of flexible film 18 overlying the area where upper electrode 20 overlaps lower electrode 14. As pressure is applied to area 26, the flexible transparent film 18 transmits the applied pressure to the underlying dielectric fluid 16. Because dielectric 16 is a fluid, the localized pressure applied at localized switch action area 26 is transmitted throughout the fluid 26 as a uniform hydrostatic pressure. Because film 18 is elastic the hydrostatic pressure displaces film 18 slightly from its normal position thereby slightly increasing the volume available to be occupied by fluid 16. The slight displacement of the non-local portion of transparent film 18 is illustrated in FIG. 1 by the differing positions of the upper surface 33 of film 18 is the open and closed positions of switch 10. When switch 10 is closed, the upper surface of the non-local portion of film 18 is displaced (as shown at 35) further from the substrate than its rest position (as shown at 34) when the switch is in its open position. In consequence of the displacement of fluid 16 from switch action area 26, fluid 16 occupies the increased volume available under the remainder of the film 18. As fluid 16 is displaced from between film 18 and substrate 14, portion 26 of film 18 is displaced toward substrate 12. When all electrically insulating fluid 16 has been displaced from between a portion of upper electrode 20 and a portion of lower electrode 14 which is in alignment therewith, electrodes 14 and 20 make electrically conducting contact and switch 10 is in its closed or electrically conducting state.

Upon removal of the pressure from flexible layer 18, local portion 26 of flexible layer 18 will be returned to its rest position by hydrostatic pressure on the fluid which results from the elasticity throughout flexible film 18 due to initial displacement and/or spring action of film 18 to return to its original state locally at position 26.

Substrate 12 is a transparent material which is rigid. Substrate 12 may be formed of glass, quartz, transparent plastic or other appropriate transparent materials. Substrate 12 is rigid in itself, so that substrate 12 and lower electrodes 14 will not be displaced in response to the application of pressure to flexible film 18. However, if desired, substrate 12 may be formed of flexible material which is in turn supported by a further substrate which is sufficiently rigid to enable the deformation of flexible film 18 to effect a closure of the switch underlying the portion of flexible film 18 to which a localized force is applied. With a flexible substrate 12, an array of switches 10 may be disposed on and conform to an uneven underlying surface. The use of a slightly flexible substrate 12 for the construction of the switch array is desirable where the switch array will be disposed on the surface of a display generating a device such as a cathode ray tube which has a non-planar surface. Once a switch array having a flexible substrate 12 has been properly disposed upon the face of a cathode ray tube or other rigid surfaced display, the substrate 12 will be supported by the rigid face of the cathode ray tube or other display and the substrate 12 of the switch array will be essentially rigid. If desired, the switch array may be fabricated on a rigid substrate having a curved surface, although such a procedure can complicate the fabrication process. Other display devices with which a switch array panel may be utilized include, but are not limited to, plasma display panels, liquid crystal display panels and electroluminescent display panels. Substrate 12 may be the front substrate of another device such as, but not limited to, plasma display panel liquid crystal display panels and electroluminescent display panels.

The transparent electrodes may be formed of any transparent conducting material including, but not limited to, thin layers of gold or other metals, tin oxide, indium oxide and indium tin oxide.

The electrically insulating dielectric fluid 16 serves at least three functions, (1) it maintains the conductors 14 and 20 separate to hold the switch in its open state, (2) it optically couples the transparent film 18 to the underlying rigid substrate 12, thereby minimizing reflections from within the switch array and (3) the viscosity of the fluid helps to determine and control both the force which must be applied in order to close a switch, the duration of the contact bounce period on closure, the length of time it takes the switch to open after pressure is removed from the associated switch action area and the duration of the contact bounce period on opening. The dielectric fluid may be any suitable fluid which will fulfill the dielectric fluid's functions and may be freon, kerosene, commercial instrument fluid (such as compass fluid) or any other suitable dielectric fluid. If desired, dielectric fluid may be a gas rather than a liquid although the small index of refraction of most gases may result in reduced optical coupling between film 18 and substrate 12.

The transparent film 18 is preferably plastic and may comprise materials which are sold under trademarks Lexand and Mylar. It is preferred to have transparent film 18 between 5 and 20 mils thick to assure its flexibility, its integrity and that it will not stretch in a localized area to such a degree that the conductors 20 on the underside thereof will crack or separate from the film.

The conductors 14 and 20 are brought to the side of the switch array structure for connection to decoding or interfacing electronics. The panel edges are sealed to prevent leakage of the dielectric fluid 16 from within the switch array. Suitable sealing materials include polyfulfide epoxy and the resilient sealing materials sold under the trademarks Tescom/20/20 and Dowcorning 3140 silastic.

In order to obtain maximum transparency for the switch array, it is preferred that the index of refraction of each of the component materials be the same or closely matched. In order to further minimize any visual discontinuity at the edges of the individual transparent conductors, it is preferred that the transparent conductors have a thickness equal to an integral multiple of one-half the wavelength of green light in the conductor material where the indexes of refraction of substrate 12, fluid 16 and film 18 are closely matched. If even greater transparency is desired, high efficiency antireflection (HEA) coatings which are known in the art may be applied as appropriate in order to maximum transmission and thus the transparency of the switch 10.

The use of transparent conductors having a wavelength equal to N/2 times the wavelength of green light makes the conductor lines nearly invisible once an appropriate dielectric fluid has been added to the structure.

A switch 10 in accordance with this invention, or an entire switch array of such switches obtains an essentially constant transparency across the whole area of the switch (array) because of the absence of internal wires, spacers or other obstructions and because of the optical coupling effects of fluid 16 and N/2 greenwavelength thick conductors.

It is preferred that switch 10 not only be transparent, but also colorless. However, for those applications where it is considered desirable, switch 10 may be made transparent only to selected colors through use of a colored substrate 12, a colored film 18 or overlaid or underlaid filters in accordance with the objective which makes it desirable to have the switch color selective in its transparency. In such cases the conductor 14 and 20 thicknesses would be adjusted accordingly.

The force required to effect a closure of a switch may be varied during design and construction of the switch by altering one or more of (1) the thickness of the transparent film 18, (2) the elasticity of the transparent film 18, (3) the volume of the cavity within which the fluid is disposed, (4) the viscosity of the fluid, (5) the amount of fluid utilized and (6) any other characteristics which influence this force. The thickness of transparent film 18 affects the amount of pressure required to close a switch because the thicker the film of a given material is, the more force is required to deform it. The elasticity controls the hydrostatic pressure on film 18 before and after depression of a switch site. The thickness of the cavity within which the fluid is disposed affects the amount of force required to close a switch because the greater the thickness of this cavity the greater is the distance that the transparent film must be displaced before contact between the upper and lower electrodes will be achieved. The viscosity of dielectric fluid 16 affects the amount of force required to close a switch because the more viscous the fluid is, the more it resists displacement from between the film and substrate in response to a localized application of force in a given time interval. The amount of fluid utilized affects the amount of force required to close a switch because inclusion of more fluid than is required to fill the space between substrate 12 and film 18 when the film 18 is unstrained will result in a tensioning of film 18 with the resulting increase in the amount of pressure required to deflect the film 18 so that upper and lower electrodes 20 and 14 make contact.

Switches of this type have been fabricated which require about 10 ounces of force to achieve switch closure and have a contact bounce on the order of 10 milliseconds. This is an excellent value for contact bounce and thus illustrates the high quality of switches which may be constructed in accordance with the invention.

The switch in accordance with FIG. 1 may be constructed in the following manner. First, a substrate 12 is selected and prepared for the deposition of material which will form lower conductors 14. The material of conductors 14 may preferably be deposited as a continuous layer after which the electrode areas may be defined by photoresist and a mask after which the undesired conducting material may be removed by etching. Alternatively, the conductors may be screened onto the substrate through a mask. If the conducting material needs to be cured or annealed, this is preferably done or completed after conductor definition.

The material which will form the transparent insulating layer 18 is then selected and prepared for deposition of the material of the transparent electrodes. The electrode material is deposited on what will be the lower or internal surface of film 18 in appropriate manner. It is considered preferable to deposit the transparent conducting material as a continuous sheet and then define the individual electrodes through a photoresist masking and etching technique. The conductor material is then cured or annealed if necessary. Thereafter, film 18 is registered with respect to substrate 12 and the switch array is filled with dielectric fluid 16 and sealed around the edges to prevent loss of the dielectric fluid.

FIG. 2 is a partial plan view of an array of switches 10 constructed in accordance with this invention and disposed in a cross bar switch array 36. This crossbar switch array comprises a plurality of substantially parallel lower electrodes 14 and a plurality of substantially parallel upper electrodes 20 oriented substantially perpendicular to lower electrodes 14 to form a rectangular array of switches. In FIG. 2, the plurality of lower electrodes 14 have been designated 14A, 14B, 14C and so on. Similarly, the plurality of upper electrodes 20 have been designated 20A, 20B, 20C and so on. The crossbar switch areas 10 associated with the crossed electrodes have been designated 10AA, 10AB, 10BA and so on where the letters following the numeral 10 are derived from the letters of the electrodes which cross to form the switch. The first letter is that of the upper electrode 20X of the switch 10XY. The second letter is that of the lower electrode 14Y of the switch 10XY. Thus, switch 10AB is associated with the overlap of upper electrode 20A and lower electrode 14B. Similarly, switch 10BA is associated with the overlap of upper electrode 20B and lower electrode 14A.

Where a crossbar switch array is utilized, coding circuitry must be provided in order to determine which switch has been closed and to control the external circuitry in a corresponding fashion. Such decoding systems can be either fairly simple or quite elaborate, depending on the complexity of the control pattern implemented by the switches. Any one of the several methods known in the art may be used to determine which switch(s) is closed.

FIG. 3 is an illustration of a cross-section taken along line 3—3 of FIG. 2. Since the cross-section is taken along the middle of electrode 20A, the switch points illustrated are 10AA, 10AB, 10AC and so on. Switch 10AC is illustrated in its closed or conducting state. Electrode 14G is illustrated as being wider than the electrodes 14A through 14F to emphasize the flexibility of electrode configuration in an array of switches constructed in accordance with this invention.

FIG. 4 is a plan view of the crossbar switch array 36 illustrated in FIG. 2 on an enlarged scale. The legend areas 22 are delineated on the illustration of FIG. 4 by boundary lines 23, which are for illustration purposes only, since they are not inherent in the switch array although, if desired, boundary lines 23 could be built into the switch array. In switch 10CA, the switch action area has been outlined by line 11. Other means for indicating the active switch area may also be utilized. With a crossbar switch array such as illustrated in FIG. 2 or 4, any desired electronic switching function can be achieved through sensing and decoding of the closed switch.

By using active display devices as all of the legends, as some of the legends, as portions of some of the legends or as overrides to normal legends, and by controlling the decoding system in accordance with the displayed legends, virtually unlimited variations may be provided in the control provided by the crossbar switch matrix of FIG. 2 to FIG. 4.

Where the control function exercised by the switch array makes it desirable that certain switches be active only at certain times, in accordance with the state of the system being controlled or the past history of switch closure, it is desirable to place a shutter over the legend to occlude portions of the legend which are not of present concern to the operator. The shutter may be incorporated between substrate 12 and legend 24. The shutter may be independent of legend 24 which may itself be alterable. The shutter may be comprised of, but is not limited to, a dynamic scattering mode liquid crystal panel, a field effect mode liquid crystal panel, a mechanical iris or a combination thereof.

Figure 5:
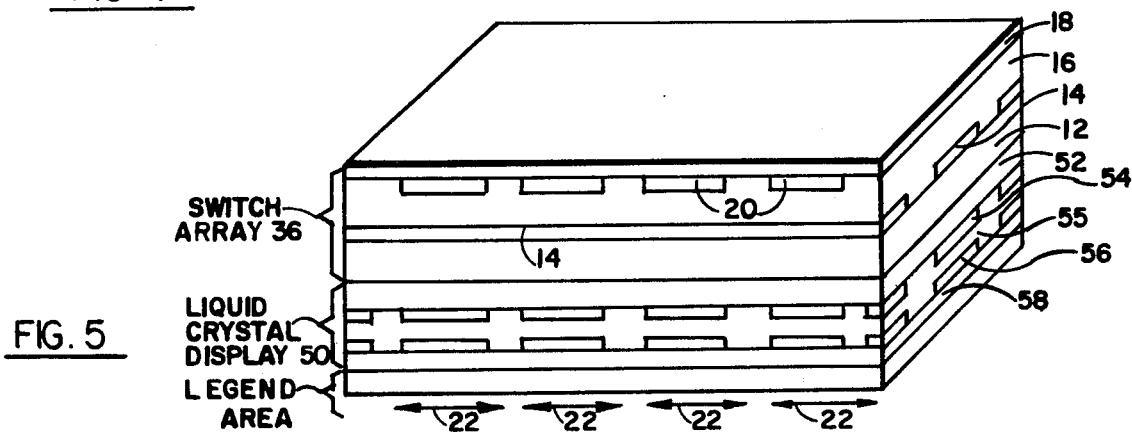
FIG. 5 is a perspective cross-section of a switch array in accordance with the invention combined with a liquid crystal display which controls the visibility of legends associated with the switches.

A dynamic scattering liquid crystal display shutter is normally preferably divided into segments corresponding to the areas 22 set aside for the legends associated with the individual switches. In this manner, the liquid crystal dynamic scattering panel can be utilized, when activated to occlude the legends of switches which are inactive or whose activation would be illogical. Occlusion is achieved by a dynamic scattering panel when it is activated because when activated it acts as optical diffusor over the legends. When not activated, the liquid crystal panel is water clear. This configuration of a switch array and a liquid crystal display with fixed legends is illustrated in perspective cross-section in FIG. 5. Transparent film 18 of a switch array 36 comprises the viewing surface of the assembly. Switch array 36 is constructed in a manner illustrated and discussed with respect to FIGS. 1 through 4. A liquid crystal display 50 underlies switch array 36. Liquid crystal display 50 includes a face plate 52 having electrodes 54 disposed on the underside thereof, a substrate 58 having electrodes 56 disposed on the upper surface thereof and a layer 55 of liquid crystal material disposed between face plate 52 and substrate 58. If desired, face plate 52 of the liquid crystal display 50 may also be the substrate 12 of switch array 36, whereby the switch array 36 and liquid crystal display 50 comprise a single unitary structure. The electrodes 54 and 56 of liquid crystal display 50 are arranged to create liquid crystal display cells registered with respect to the overlying switch action areas of switch array 36. Switch legend areas 22 underlie the individual liquid crystal display cells in registration with the switch action areas of switch array 36.

A similar effect can also be achieved through use of transparent legends with light sources behind them, with the light source being activated only when the switch is active or its actuation is logical. In either of these techniques, the effect of an active display behind the switch array panel is achieved without the necessity of the legend itself having the ability to display randomly generated characters.

Decoding of the switch array may be performed by decoding logic which determine which switch or switches are closed. The output from the decoding network which specifies the switches which are closed may (1) directly control external circuits where no variation in the control resulting from activation of a given switch is desired or (2) may be used as the input to a logic system which controls external circuitry in accordance with one or more of (a) which switches are presently activated (b) the past history of switch actuations and (c) the legends displayed.

Thus, the versatility of the switch array of this invention is enormous and is limited only by the ingenuity utilized in generating the legends to be associated with the switches and the decoding system for sensing and decoding the switch actuation and controlling external circuits thereby.

FIG. 6 illustrates a possible electrode configuration for a single pole single throw switch 60. Switch 60 may comprise two electrodes 62 and 64 disposed on the rigid substrate 12 and an overlying circular or spot electrode 66 on transparent film 18 at the location where switch action is desired. By pressing on film 18 above spot electrode 66, electrode 66 is brought into contact with both of the underlying electrodes 62 and 64 thereby actuating (closing) switch 60. Alternatively, the electrode 62 and 64 may be applied to film 18 and electrode 66 applied to substrate 12. As a further alternative, electrode 62 may be applied to film 18 and electrode 64 to substrate 12 thus eliminating electrode 66.

Figure 7:
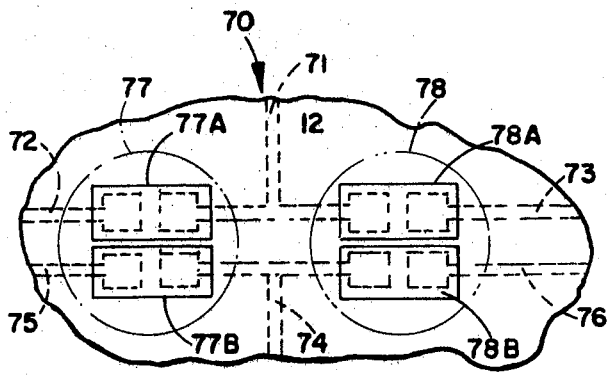
FIG. 7 illustrates a possible electrode configuration for a double pole double throw switch.

FIG. 7 illustrates a possible electrode configuration for a double pole double throw switch 70. Switch 70 comprises electrodes 71, 72, 73, 74, 75, and 76 disposed on rigid substrate 12 and electrodes 77a, 77b, 78a and 78b disposed on transparent film 18. Conductors 71 and 74 are the common conductors of the double pole double throw switch.

Electrodes 77a and 77b are disposed on transparent film 18 within a common switch action area 77. Electrode 77a overlies contact portions of electrodes 71 and 72 and electrode 77b overlies contact portions of electrodes 77b overlies contact portions of electrodes 74 and 75. Consequently, when switch action area 77 is depressed electrode 77a makes contact with and completes the circuit between electrodes 71 and 72 and electrode 77b makes contact with and completes the circuit between electrodes 74 and 75. Similarly, electrodes 78a and 78b are disposed on transparent film 18 within a common switch action area 78. Electrode 78a overlies contact portions of electrodes 71 and 73 and electrode 78b overlies contact portions of electrodes 74 and 76. Consequently, when switch area 78 is depressed electrode 78a makes contact with and completes the circuit between electrodes 71 and 73 and electrode 78b makes contact with and completes the electrical circuit between electrode 74 and 76.

Figure 8:
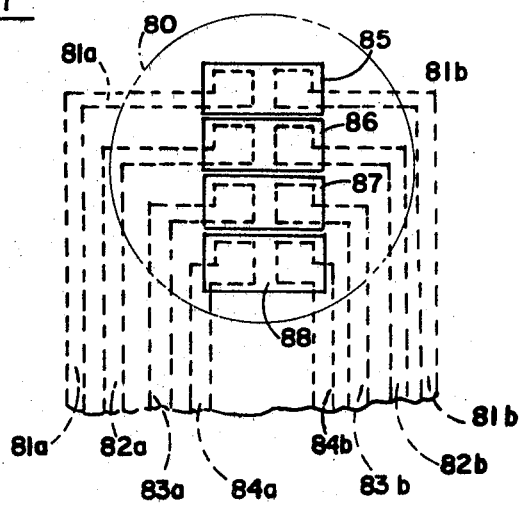
FIG. 8 illustrates one manner in which a plurality of ganged switches may be positioned for actuation by depression of a single switch area.

FIG. 8 illustrates one manner in which ganged switches may be arranged to be activated by the depression of a single switch action area 80. Electrodes 81a and 81b; 82a and 82b; 83a and 83b and 84a and 84b each of which have contact portions underlying the common switch action area 80 are positioned on rigid substrate 12 in registration with electrodes 85, 86, 87 and 88 respectively. Consequently, when switch action area 80 is depressed electrodes 85, 86, 87 and 88 make contact electrodes 81a and 81b; 82a and 82b; 83a and 83b; and 84a and 84b respectively, thereby closing switches 81, 82, 82 and 84.

Figure 9:
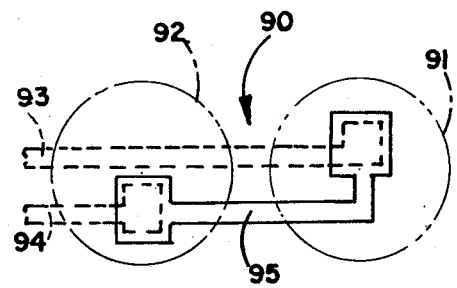
FIG. 9 illustrates a manner in which electrodes may be configured to require the depression of more than one switch area to close a circuit.

FIG. 9 illustrates a manner in which the transparent switches of this invention may be constructed to form a switch 90 which may only be closed through simultaneous depression of two separate switch action areas 91 and 92 of transparent film 18. Electrodes 93 and 94 are disposed on rigid substrate 12. Electrode 93 has a contact portion underlying switch action area 91. Electrode 94 has a contact portion underlying switch action area 92. An electrode 95 disposed on transparent film 18 has a contact portion within switch action area 91 in registration with the contact portion of electrode 93. Electrode 95 also has a contact portion within switch action area 92 in registration with the contact portion of electrode 94. Due to the configuration of the electrodes, electrode 93 on rigid substrate 12 will be electrically connected to electrode 94 when switch action areas 91 and 92 are simultaneously depressed to bring electrode 95 in contact with electrodes 93 within switch action area 91 and to simultaneously bring electrode 95 into contact with electrode 94 within switch action area 92. Thus, switch 90 provides a function of requiring simultaneous depression of separate switch action areas in order to close the switch. This provides a safety feature tending to prevent accidental activation of the circuit controlled by switch 90. Switches of the type illustrated in FIG. 6 may also be used to construct switches requiring simultaneous depression of two switch action areas in order to complete a circuit. It will be readily apparent to those skilled in the art that the number of switch action areas which must be simultaneously depressed in order to complete a circuit can be increased at will through use of these techniques. Further it will be apparent that the electrodes can be arranged into any other switch configuration to achieve other logic, interlock, and switch configurations or combinations thereof.

Figure 10:
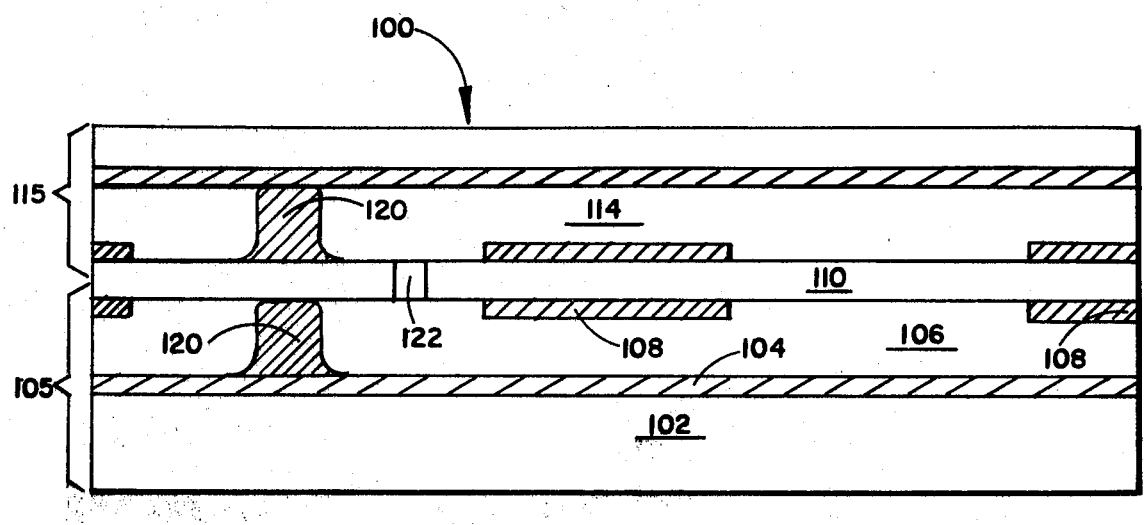
FIG. 10 is a cross-section taken through a transparent switch array including two separate layers of switches one on top of the other.

FIG. 10 is a cross-section through an additional embodiment of the invention. A multilayer, cascaded switch array is shown generally at 100 in FIG. 10, in cross-section. Cascaded switch array 100 comprises a plurality of layers. These include a transparent rigid substrate 102, a first set of lower electrodes 104, a first layer 106 of dielectric fluid, a first set of upper electrode 108 disposed on the underside of a first flexible film 110, a second layer of lower electrodes 112 disposed on the upper surface of film 110, a second layer 114 of dielectric fluid, a second set of upper conductors 116 disposed on the underside of a second or upper flexible film 118. This structure corresponds to a first switch array 105 comprised of layers 102 through layers 110 which is similar to the switch 10 illustrated in FIG. 1 and a second switch array 115 comprised of layers 110 through 118 similar to the switch 10. In switch array 115, the "substrate" 110 is flexible and comprises the upper surface of the lower switch set 105. This technique can be utilized to provide a plurality of cascaded switches in which all the switches underlying a point at which local pressure is applied are actuated by a single depression of that point. If desired, the dielectric fluid 106 and the dielectric fluid 114 may be in fluid communication, either through openings 122 in film 110 or by providing a by-pass around film 110 which allows communication between fluids 106 and 114.

Where a large switch array (either single layer as in FIGS. 1-4 of multilayer as in FIG. 10) is utilized there can be a problem of the dielectric fluid flowing toward the lower side of the switch array if it is positioned with the substrate in a vertical position. This problem can be minimized by including barriers or dividers 120 (FIG. 10) which adhere either to the substrate or the film or both within the switch array. These barriers 120 may preferably be made transparent and optically coupled to the fluid, the substrate and the film. Any electrically insulating material may be used to form barriers 120 so long as it is compatible with the other materials utilized. Barriers 120 preferably comprise two sets of parallel barriers perpendicular to each other in order to divide the switch in to a plurality of separate fluid compartments. Barriers 120 reduce the effective pressure head of the dielectric fluid 106 or 114. When the substrate is positioned vertically because instead of having a pressure head at the bottom of the array which is determined by the heighth of the array, the pressure head is determined by the heighth of the individual compartments. This minimizes the problem of dielectric fluid flow. If desired, the barriers 120 may be made intentionally visible, such as by making them black in order to delineate the boundaries between different portions of the switch array. If desired, the compartments which are bounded by barriers 120 may be as small as a single switch area, although this will not generally be necessary to minimize fluid flow problems.

The mechanism for allowing the dielectric fluid 16 (liquid or gas) to be displaced from between overlapping contact when pressure is applied to the corresponding switch action area 26 of transparent film 18 has been described in terms of a slight displacement of the remaining portion 28 of film 18. This is a highly satisfactory way of providing the displacement of fluid 16 and is considered the most easily implemented way of allowing for this displacement. However, it is possible to provide other means for "absorbing" the displaced volume of fluid or controlling the fluid pressure. Such means may include a reservoir of variable capacity in fluid communication with the dielectric fluid 16 which separates film 18 from substrate 12. If such a technique is utilized, the force necessary to effect a switch closure can be controlled by adjusting the internal hydrostatic pressure present within the switch array when no localized pressure is applied. This pressure can be made variable by providing external means for adjusting the volume of the reservoir while the total quantity of fluid contained in the reservoir and switch array is maintained constant. Under these conditions a decrease in the volume of the reservoir will force more fluid into the switch array thereby forcing film 18 to stretch and expand the volume contained between substrate 12 and film 18. Such control may be desired but not limited to render more tactil feedback to the operator and/or to adapt to extremes in environment conditions of pressure and temperature and/or to augment storage.

A switch which is transparent and suitable for use in arrays of switches has been disclosed which allows the nomenclature to be associated with the switch to be easily changed or determined in accordance with the application of the switch. This eliminates the need to stock switches with many different nomenclatures with the various uses to which the switch may be put. Instead, the switches may be stocked as general categories and the switch nomenclature separately stocked as sheets of paper to be placed behind the switch. Further, for the replacement use, the nomenclature originally associated with the switch may be retained and there is no need to replace the nomenclature. Preferred embodiments of the switch have been described. It is expected that those skilled in the art will be able to make variations in the details of the switch without departing from the invention. However, since the preferred embodiments are illustrative only and not limitive, the protection provided this invention is limited only by the attached claims.

What is claimed is:
1. An operator guiding switch array comprising:
transparent switch array means having a plurality of switch areas and comprising:
transparent, electrically insulating, switch substrate means having upper and lower surfaces;
transparent lower switch electrode means disposed on said upper surface of said switch substrate means;
a layer of transparent dielectric fluid disposed over said upper surface of said switch substrate means and said lower switch electrode means;
transparent flexible film means disposed over said said dielectric fluid;
transparent upper switch electrode means disposed on said film means, interposed between said film means and said dielectric fluid at least in selected locations and overlapping said lower switch electrode means at at least one location within each switch area of the array;
within each switch area of the array, said upper and lower switch electrode means together comprising the contacts of a normally open switch which may be closed by application of pressure to said flexible film means within said switch area;
legend means disposed beneath said lower surface of said switch substrate means for indicating the functions of the individual switch areas;
means for selectively obscuring images viewed through selected ones of said switch areas in accordance with external control signals, said means for obscuring comprising liquid crystal display means disposed between said switch substrate means and said legend means, said liquid crystal display means comprising:
transparent electrically insulating display substrate means having upper and lower surfaces;
transparent display lower electrode means disposed on said upper surface of said display substrate means;
a layer of a nematic liquid crystal disposed over said upper surface of said display substrate means and said lower display electrode means;

transparent display faceplate means disposed over said layer of liquid crystal material;

transparent upper display electrode means disposed on said display faceplate means, interposed between said faceplate means and said liquid crystal at least in selected locations and overlapping said lower display electrode means within areas aligned with selected switch areas;

said upper and lower display electrodes being configured to define liquid crystal display areas which are substantially coextensive with switch areas vertically aligned therewith, said display areas being selectively controllable for obscuring images viewed through said display areas and the aligned switch areas, in accordance with an external display control signal whereby the legend associated with an individual switch area may be obscured in response to said external control signals to indicate that the associated switch should not be activated.

2. The switch array recited in claim 1 further comprising insulation means selectively disposed between said upper and lower switch electrodes for preventing the formation of a switch at selected locations where said upper switch electrode means overlaps said lower switch electrode means.

3. The switch array recited in claim 1 wherein:

said lower switch electrode means comprise a plurality of discrete lower switch electrodes; and said upper switch electrode means comprise a plurality of discrete upper switch electrode means and said upper and lower discrete switch electrodes are disposed in a manner to form at least one circuit which requires the closure of at least two switches in order to complete the circuit.

4. The switch array recited in claim 1 wherein in at least one switch area more than one switch is formed whereby actuation of the said at least one switch area will close a plurality of switches.

5. The switch array recited in claim 1 further comprising:

second transparent lower switch electrode means disposed on an upper surface of said transparent flexible film means;

a second layer of transparent dielectric fluid disposed over said upper surface of said flexible film means and said second lower switch electrode means;

second transparent flexible film means disposed over said second layer of dielectric fluid;

second upper switch electrode means disposed on said second flexible film means, interposed between said second film means and said second layer of dielectric fluid, at least in selected locations and overlapping said second lower switch electrode means within at least one switch area; and said second upper and said second lower switch electrode means within said at least one switch area comprising the contacts of a normally open switch which may be closed by application of pressure to said second flexible film means within said at least one switch area.

6. The switch array recited in claim 1 further comprising fluid barrier means interposed between said switch substrate means and said film means to partition said layer of dielectric fluid.

7. The switch array recited in claim 1 wherein said legend means comprises an active display device for generating legends to be associated with said switch.

8. The switch array recited in claim 1 wherein said legend means comprise printed legends.

* * * * *